Nov. 20, 1934.     F. H. GLEASON     1,981,802
LUBRICATING APPARATUS
Filed May 15, 1929     3 Sheets-Sheet 1
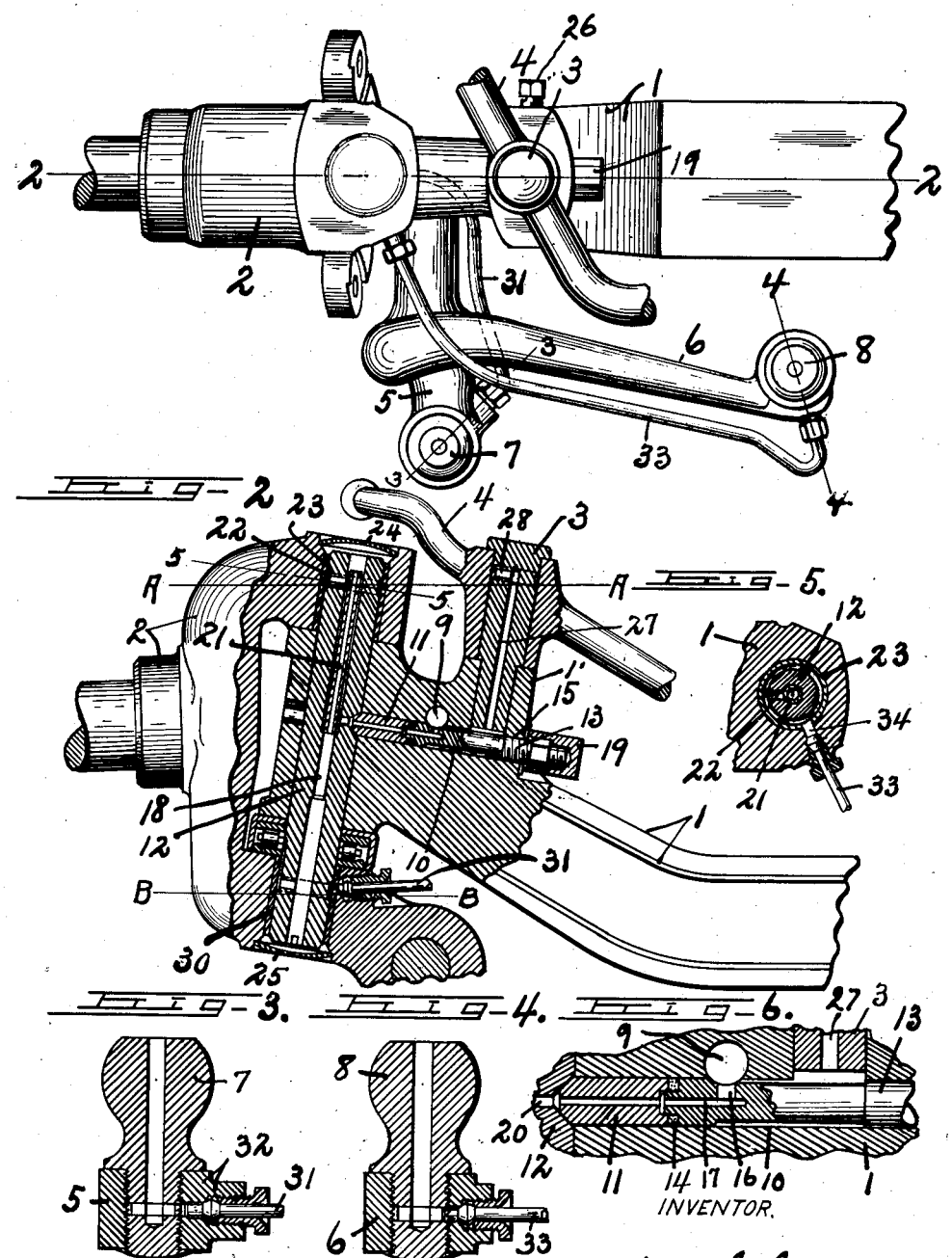
INVENTOR.
BY F. H. Gleason
Denison Thompson
ATTORNEYS.
WITNESS
H. L. Meade.

Nov. 20, 1934.  F. H. GLEASON  1,981,802
LUBRICATING APPARATUS
Filed May 15, 1929    3 Sheets-Sheet 2
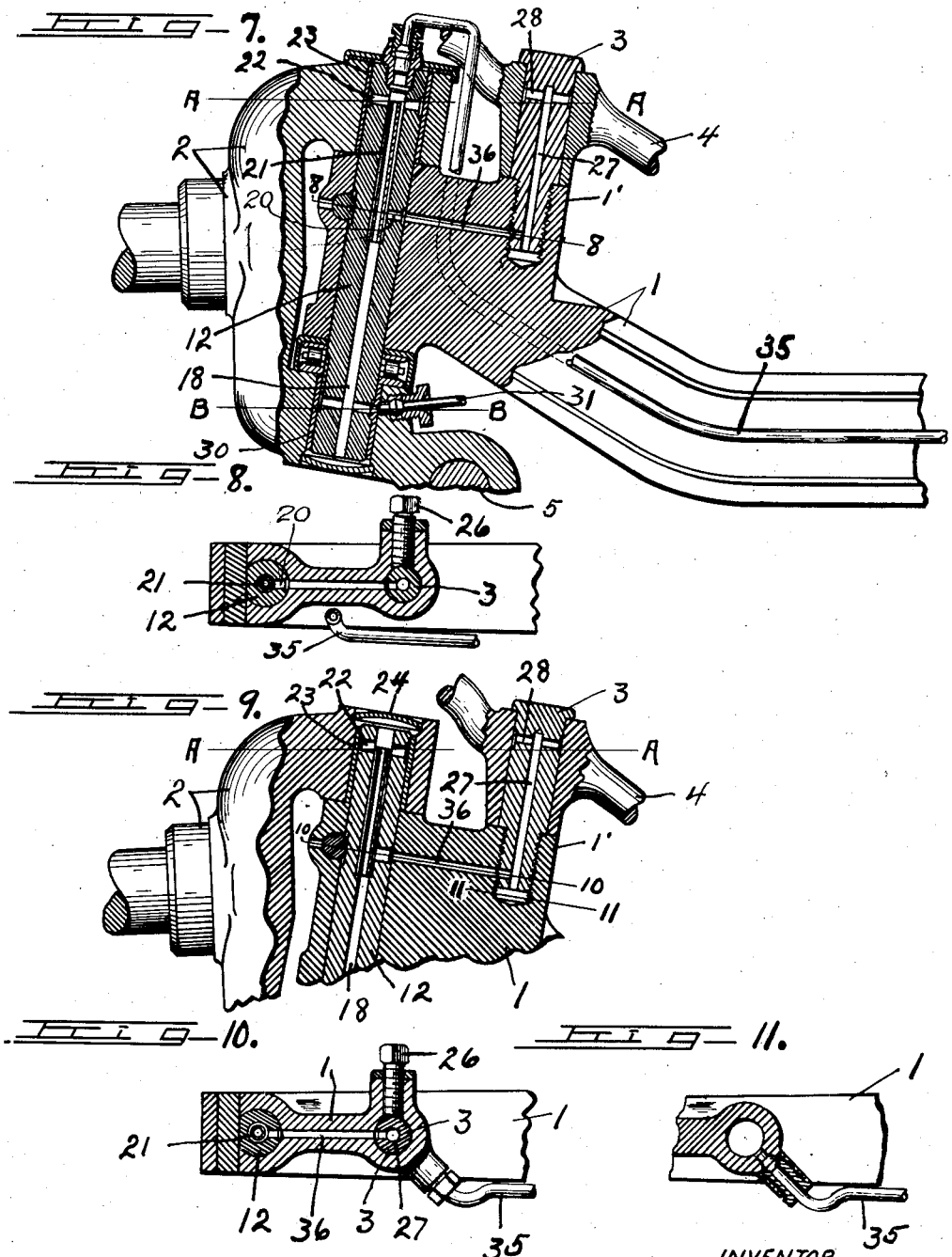

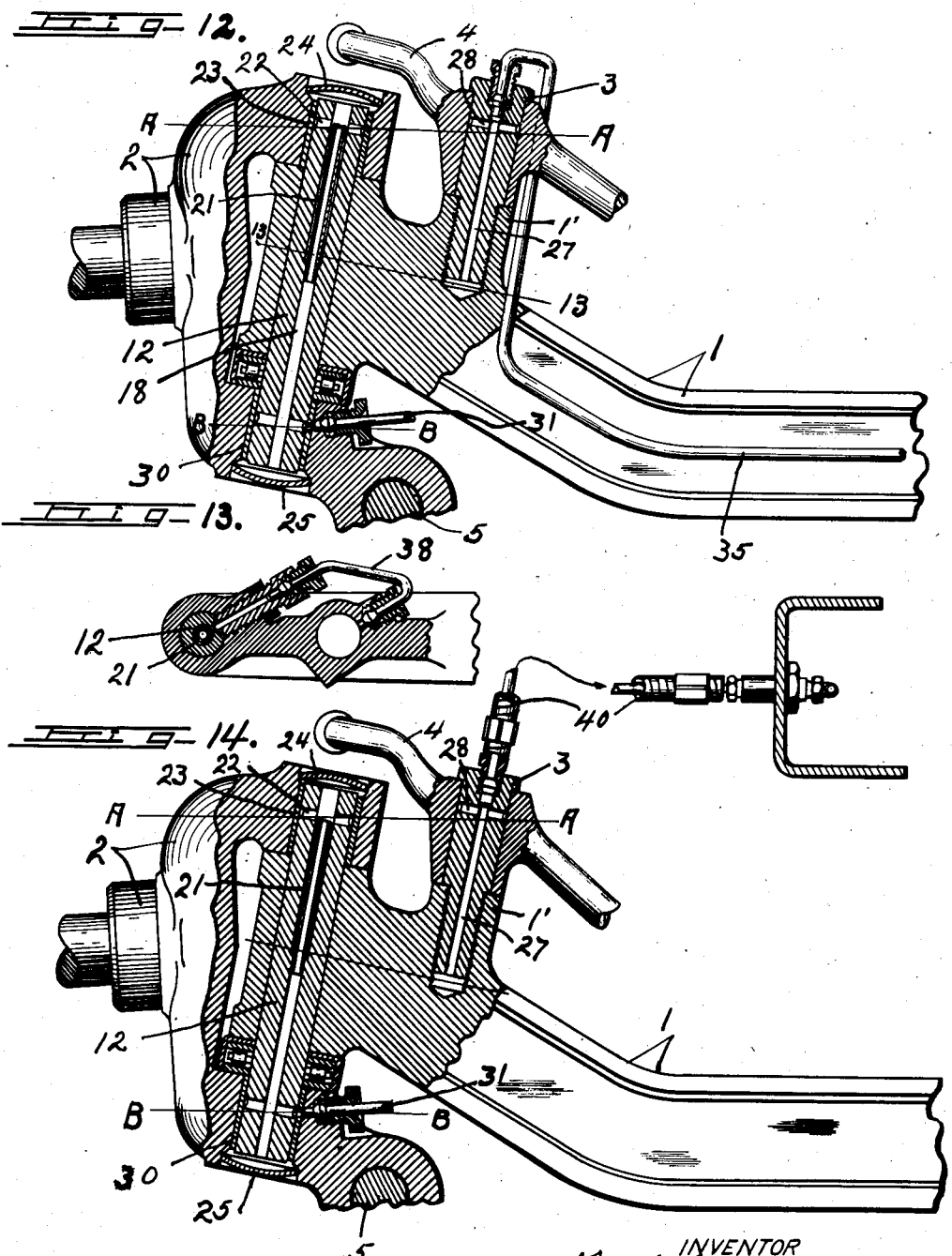

Patented Nov. 20, 1934

1,981,802

UNITED STATES PATENT OFFICE 1,981,802

LUBRICATING APPARATUS

Frederick H. Gleason, Auburn, N. Y., assignor to Bowen Products Corporation, Auburn, N. Y., a corporation of New York Application May 15, 1929, Serial No. 363,295

8 Claims. (Cl. 184—7)

This invention relates to certain new and useful improvements in means for lubricating the brake shaft stud and the bearings in connection with the steering knuckle of a vehicle, such as an automobile.

The main object of the invention is to provide an apparatus whereby desired proportioned quantities of lubricant will be supplied to a plurality of bearings from a single lead that is connected to a source of lubricant adapted to intermittently supply a measured quantity of lubricant to such lead and thereby to an initial point of discharge from which the lubricant is thereafter automatically divided and supplied in proportional quantities to the several bearings, such as the upper and lower spindle bolt bearings, the drag link bearing, the tie-rod bearing and the brake stud bearing.

A further advantage resides in a structure in which a liquid-tight U-tube is utilized for maintaining a supply of lubricant at a constant level in the structure, combined with means for supplying lubricant at some point along the U-tube and from which tube overflow of the lubricant acts to supply the lubricant to another bearing or bearings in addition to those adjacent the upper end of the U-tube.

Other objects and advantages relate to the details of the structure and the form and relation of the parts thereof, all as will more fully appear from the following description taken in connection with the accompanying drawings, in which:—

Figure 1 is a top plan view of an apparatus of this invention.

Figure 2 is a section on line 2—2, Figure 1.
Figure 3 is a section on line 3—3, Figure 1.
Figure 4 is a section on line 4—4, Figure 1.
Figure 5 is a section on line 5—5, Figure 2.
Figure 6 is an enlarged section of the base of the U tube illustrated in Figure 2.
Figure 7 is a section similar to Fig. 2 of a modified form of structure.
Figure 8 is a section on line 8—8, Figure 7.
Figure 9 is a sectional view similar to Figure 2 of a further modified form of structure.
Figure 10 is a section on line 10—10, Figure 9.
Figure 11 is a section on line 11—11, Figure 9.
Figure 12 is a sectional view similar to Fig. 2 of a further modified form of structure.
Figure 13 is a section on line 13—13, Figure 12.
Figure 14 is a sectional view similar to Figure 10 of a slightly modified form of structure.

In Fig. 1 there is shown an axle end 1 with steering knuckle 2, a brake-stud bearing 3 mounted in the axle end adapted for journaling the brake rocker lever 4 which operates the brake shoes, also tie-rod 5 and drag-link 6 in connection with the steering knuckle 2 and provided with the usual ball studs 7 and 8 respectively.

Means is provided for delivering a measured volume of oil from a suitable source to the associated bearings and as illustrated in Figs. 1, 2 and 3, this connection is made by means of a tube or conduit leading from such source to the passageway 9 in the axle end 1.

This passage 9 communicates with a conduit 10 extending through the axle end 1 as shown at substantially right angles to the direction of the passage way 9. This conduit has assembled in it a tubular plug 11 having a tapered front end adapted to seat in a similarly formed recess in the spindle bolt 12 mounted in the axle end and upon which spindle bolt the steering knuckle 2 is mounted for swinging movement.

The plug 11 when pressed inwardly acts to lock the spindle bolt against rotary or axial movement in the axle and the plug 11 is normally held in proper position by means of a threaded bolt-like part 13 with a reduced diameter at its forward end adapted to slidably fit in a recess formed in the rear end of the plug 11. A soft copper washer 14 is mounted on the reduced end of bolt 13 and positioned between the plug 11 and the bolt 13, and when the bolt 13 is assembled in the conduit 10, the outer end of the bolt being threaded into the interiorly threaded part of axle end 1 at 15, the tapered end of plug 11 is pressed into oil-tight engagement with the recessed portion of the spindle bolt 12 and the copper washer 14 is expanded out by the pressure thereby forming an oil-tight joint between the interior wall of the conduit 10 and the washer 14.

A radial oil passage 16 and an axial oil passage 17 are provided in the bolt 13 and leading to the passageway through plug 11 to a hole 20 leading through the wall of the spindle bolt 12 to the passageway between the stand pipe 21 and the hole in the spindle bolt. A cap 19 is adapted to be assembled on the outer threaded end of bolt 13 with a gasket under the same to prevent any oil leak out around the threads of the bolt.

The conduit through the spindle bolt 12 is reduced in diameter just below the hole 20 and a stand pipe 21 is arranged coaxially in the conduit with its lower end fitting in an oil-tight manner in the reduced portion of the wall of the conduit in spindle bolt 12. This stand pipe extends upwardly to a point above the radial oil hole 22 in the spindle bolt and which is adapted to supply oil to the upper bearing 23 of the spindle bolt.

The upper and lower ends of the steering knuckle journals may be closed oil-tight by means of press-fit caps 24 and 25.

The brake stud bearing 3 is perhaps preferably as shown in Figure 1 a drive and oil-tight fit in the boss 1' in the axle end and may be held in place as by a set screw 26. The stud is formed with an axial conduit 27 which extends from its lower end to a point spaced a short distance from its upper end, at which point it communicates with a radial conduit 28 for supplying lubricant to the brake rocker lever bearing on the stud 3.

The oil passage or conduit 27 in stud 3 communicates with conduit 10, and as the diameter of the bolt 13 between passageway 9 and the end of passageway 27 is of less diameter than the interior diameter of conduit 10, lubricant can flow from passageway 9 to the passageway 27. The stand pipe 21 acts to maintain an oil level in the conduit in the spindle bolt 12 and in the passageway 27 at substantially the upper end of the stand pipe 21, as indicated by the line A—A.

In operation, oil is maintained in the assembly described on a level with the top oil outlet passage 28 in the brake-stud and substantially the oil outlet 22 near the top of the stand pipe in the spindle bolt, and when further oil is supplied through passageway 9, the oil level at the top of the brake stud 3 and the top of the stand pipe 21 is raised and oil is supplied through passageway 28 to the brake stud bearing, and also to the top spindle bolt bearing 23, and when the oil level is raised so as to overflow into the passageway in the stand pipe 21, oil flows downwardly to the lower bearing 30 on the spindle bolt, and an oil level is maintained in the lower ends of the spindle bolt at about the line B—B.

At or adjacent this point the tube 31 is connected in a passageway through the steering knuckle leading to the bearing 30 as by the usual tubing nut and tubing sleeve, and tube 31 leads to and is connected as by a tubing sleeve and tubing nut to the tie-rod bearing 32 so that when the level of oil in the lower ends of the spindle bolt is raised above the normal level at line B—B, oil overflows through tube 31 to the tie-rod bearing.

Further, the tube 33 connected to the draglink bearing 8 as by means of the usual tubing sleeve and nut, has its opposite end connected to a passageway 34 which penetrates the upper steering knuckle 2 and bearing 23 at a point on a level with the oil passage 22 so that when lubricant is supplied to the upper spindle bolt bearing, the tube 33 also conveys lubricant to the drag-link bearing the latter connection being shown in Figure 4.

The structures in the remaining figures operate to effect the same result as that described in connection with Figures 1 to 6 inclusive, but illustrate the practicability of feeding the lubricant to the U-tube at various points along its length.

In Figures 7 and 8 the construction of the axle end, steering knuckle bolt and brake stud bearing are substantially the same as shown in previous figures, but the tube 35 leading from the source of lubricant instead of feeding the base of the U-tube as through the passageway 9 in Figure 2, feeds into and is connected to the upper end of the spindle bolt 12 and lubricant fills the U-tube, including the portion surrounding the stand pipe 21 and flows to the vertical passageway in the brake-stud bearing 3 through passageway 36 formed in the axle end 1 and registering with a radial passageway through the spindle bolt 12. The spindle bolt 12 is secured in the axle end 1 by means of a tapered wedge pin located as shown, this wedge pin being located opposite the oil passage 36 in the axle end and the radial oil passage 20 tends to force the spindle bolt over so that the oil passageways make an oil tight connection.

The supply of lubricant to the upper bearing for the spindle bolt 12 and for the brake stud bearing 3 is effected in the same manner, as shown in connection with Figures 1 to 6 inclusive, the feature of distinction between the two structures being the fact that lubricant is initially fed to the upper end of the U-tube which surrounds the stand pipe 21 and is fed from this end of the U-tube across the base of the U-tube and into the vertical passageway in the brake stud bearing.

The supply of lubricant to the lower spindle bolt bearing and to the tie-rod bearing and the drag link bearing is effected in exactly the same manner as shown in connection with Figures 1 to 6 inclusive.

The structure shown in Figures 9, 10 and 11 is the same as that shown in the previous Figures 7 and 8 except that tube 35 which supplies lubricant to the U-tube is connected in an opening penetrating the axle end 1 just below the brake stud bearing 3 and supplies the U-tube with lubricant through the passage 27 in the bearing 3.

Figures 12 and 14 illustrate a modified form of previous structures in that the initial supply of lubricant from tube 35 is carried into the upper end of the tubular brake stud bearing 3, connection being made by the usual tubing sleeve and tubing nut. The lubricant is supplied to the brake-stud bearing and flows downwardly through the conduit therein and is carried across to the base of the U-tube in the spindle bolt by means of a separate tube 38 connected as by tubing sleeve and tubing nut in an opening penetrating the axle end at the base of the brake-stud bearing 3, and also penetrating the axle end and the spindle bolt 12 at a point adjacent the base of that portion of the U-tube within the spindle bolt 12.

This connection is shown in detail in Figure 13 and differs from the previous construction in the provision of a separate tube adapted to constitute the base of the U-tube in place of a passageway drilled through the axle end. The supply of lubricant to the several bearings from the U-tube is effected in the same manner in this construction as in the previous figures.

Figure 14 differs from Figure 12 solely in the provision of a flexible tube connection 40 extending from the chassis frame in the place of the tube 35, which latter tube is carried along the axle.

Altho I have shown and described specific constructions of apparatus as constituting varied embodiments of the invention, I do not desire to restrict myself to the details of form, construction and arrangement, as various changes and modifications may be made within the scope of the appended claims.

1. In a lubricating system, the combination with two bearings, of a U-tube having the open ends of its legs adapted to supply lubricant to respective bearings, means for supplying lubricant to the U-tube, a third bearing at a lower level supplied with lubricant when the U-tube overflows, and an additional bearing supplied with lubricant from the third-named bearing when the level of lubricant in said bearing exceeds a pre-determined point.

2. In a lubricating apparatus, two bearings at substantially the same level, a U-tube structure having the upper ends of its legs terminating adjacent respective bearings to maintain a lubricant level, means for supplying lubricant to the U-tube, a third bearing at a lower level supplied with lubricant when the U-tube overflows, and an additional bearing supplied with lubricant from the third named bearing when the level of lubricant in said bearing exceeds a pre-determined point.

3. A lubricating system comprising an axle end, a spindle bolt mounted in the axle end and having upper and lower bearings, a brake-stud bearing mounted on the axle end, a U-tube structure having its open upper ends terminating adjacent the upper spindle bolt bearing and the brake-stud bearing respectively a tubular plug in said U-tube, and means for supplying lubricant to the U-tube structure.

4. A lubricating system comprising an axle end, a spindle bolt mounted in the axle end and having upper and lower bearings, a brake-stud bearing mounted on the axle end, a U-tube structure having its open upper ends terminating adjacent the upper spindle bolt bearing and the brake-stud bearing respectively, means for supplying lubricant to the U-tube structure, means for supplying lubricant from said U-tube structure to the lower spindle bolt bearing when the former overflows, a tie-rod bearing, and means for supplying lubricant from the lower spindle bolt bearing to the tie-rod bearing when the level in the former exceeds a predetermined point.

5. A lubricating system comprising an axle end, a spindle bolt mounted in the axle end and having upper and lower bearings, a brake-stud bearing mounted on the axle end, a U-tube structure having its open upper ends terminating adjacent the upper spindle bolt bearing and the brake-stud bearing respectively, means for supplying lubricant to the U-tube structure, means for supplying lubricant from said U-tube structure to the lower spindle bolt bearing when the former overflows, a tie-rod bearing, means for supplying lubricant from the lower spindle bolt bearing to the tie-rod bearing when the level in the former exceeds a pre-determined point, a drag-link bearing, and means for supplying lubricant from the upper spindle bolt bearing to the drag-link bearing when the U-tube structure overflows.

6. In a lubricating system, an axle end, a spindle bolt mounted in the axle end and formed with a recess, a brake-stud bearing mounted on the axle end, a passageway in the axle end, a tubular plug in said passageway and having a tapered end seated in the recess in the spindle bolt, a lubricant supply passage in the axle end, means of communication between the supply passage and the conduit in said plug, means of communication between the conduit in the plug and the spindle bolt bearing, and means of communication between the lubricant supply passageway in the axle end and the brake stud bearing.

7. A lubricating system comprising an axle end, a spindle bolt mounted in the axle end and having upper and lower bearings, a brake stud bearing mounted on the axle end, a U-tube structure comprising a lubricating passageway in said spindle bolt in communication with the upper spindle bolt bearing, a lubricating passageway in said stud and a conduit connecting said passageways, means for supplying lubricant to said U-tube structure, a plug in said conduit having a tapered end in contact with the spindle bolt, said plug preventing leakage of lubricant around said spindle bolt, and means for supplying lubricant which overflows from the U-tube to the lower spindle bolt bearing.

8. A lubricating system comprising an axle end, a spindle bolt mounted in the axle end and having upper and lower bearings, a brake stud bearing mounted on the axle end, a U-tube structure comprising a lubricating passageway in said spindle bolt, a lubricating passageway in said stud and a conduit connecting said passageways, means for supplying lubricant to said U-tube structure, a plug in said conduit having a tapered end in contact with the spindle bolt, said plug preventing leakage of lubricant around said spindle, means for supplying lubricant which overflows from the U-tube to the lower spindle bearing, additional means for supplying lubricant to the upper spindle bearing when lubricant overflows from the U-tube, additional means to supply another bearing with lubricant from the upper spindle bearing, and means for supplying another bearing with lubricant from the lower spindle bearing.

FREDERICK H. GLEASON.